US009076025B2

United States Patent
Wang et al.

(10) Patent No.: US 9,076,025 B2
(45) Date of Patent: Jul. 7, 2015

(54) CARD CONNECTOR

(71) Applicant: Cheng Uei Precision Industry Co., Ltd., New Taipei (TW)

(72) Inventors: Xiang Wang, Dong-Guan (CN); Wei Hong Liao, Dong-Guan (CN); Yin-Lung Wu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 100 days.

(21) Appl. No.: 13/916,575

(22) Filed: Jun. 12, 2013

(65) Prior Publication Data

US 2014/0370722 A1  Dec. 18, 2014

(51) Int. Cl.
| | |
|---|---|
| *H01R 12/00* | (2006.01) |
| *G06K 7/00* | (2006.01) |
| *G06K 13/00* | (2006.01) |
| *H01R 12/71* | (2011.01) |
| *H01R 13/24* | (2006.01) |
| *H04M 1/02* | (2006.01) |
| *G06K 13/08* | (2006.01) |
| *H01R 27/02* | (2006.01) |

(52) U.S. Cl.
CPC  *G06K 7/00* (2013.01); *G06K 13/00* (2013.01); *H01R 12/714* (2013.01); *H01R 13/2442* (2013.01); *H01R 27/02* (2013.01); *H04M 1/0274* (2013.01); *G06K 7/0073* (2013.01); *G06K 13/085* (2013.01)

(58) Field of Classification Search
CPC .......... H01R 23/7005; H01R 23/7068; G06K 13/08; G06K 7/0021
USPC ................... 439/64, 159, 630, 631
See application file for complete search history.

(56) References Cited

U.S. PATENT DOCUMENTS

| | | | | |
|---|---|---|---|---|
| 6,991,480 | B2 * | 1/2006 | Katayanagi et al. | 439/159 |
| 7,094,107 | B2 * | 8/2006 | Wu et al. | 439/630 |
| 7,431,618 | B2 * | 10/2008 | Jin | 439/630 |
| 7,612,993 | B1 * | 11/2009 | Takei et al. | 361/679.31 |
| 8,038,477 | B2 * | 10/2011 | Zhang | 439/630 |
| 8,465,326 | B1 * | 6/2013 | Xie et al. | 439/630 |
| 8,568,174 | B2 * | 10/2013 | Liu | 439/630 |
| 8,734,188 | B2 * | 5/2014 | Nakase et al. | 439/630 |
| 8,827,749 | B2 * | 9/2014 | Kim | 439/629 |

* cited by examiner

*Primary Examiner* — Thanh Tam Le
(74) *Attorney, Agent, or Firm* — Cheng-Ju Chiang

(57) ABSTRACT

A card connector includes an insulating body defining at least one receiving cavity for receiving an electronic card, electrical terminals disposed in the insulating body and projecting into the receiving cavity for contacting with the electronic card, and a securing part. One wall of the receiving cavity is opened with a slot and a ring-shaped receiving groove communicated with the slot and penetrating through the wall to communicate with the receiving cavity. A pillar is formed in the receiving groove. The securing part has a semi-ring elastic portion sleeved round the pillar and located in the receiving groove, and a pair of positioning arms parallelly extending from free ends of the elastic portion to be inserted in the slot and elastically abut against two inner sidewalls of the slot. The elastic portion projects into the receiving cavity for elastically resisting against one side edge of the electronic card.

6 Claims, 6 Drawing Sheets

CARD CONNECTOR

BACKGROUND OF THE INVENTION

1. Field of the Invention

The present invention generally relates to a connector, and more particularly to a card connector.

2. The Related Art

With the development of electronic technology, card connectors are widely used in portable electronic products, such as mobile phones, for receiving electronic cards therein, such as SIM (Subscriber Identity Module) cards or SD (Secure Digital) memory cards. Accordingly, a card connector capable of receiving more than one electronic card comes with the tide of fashion to meet different requirements for users.

At present, the card connector generally includes a first insulating body, a second insulting body mounted on the first insulating body, a plurality of electrical terminals disposed in the first insulating body and the second insulating body, and a shielding shell enclosing the first insulating body and the second insulating body. The first insulating body and the second insulating body each define at least one receiving cavity for receiving the electronic cards therein. The electrical terminals further project into the receiving cavities to electrically contact with the electronic cards.

However, for the electronic cards, the insertion and extraction force only depends on the friction of the electrical terminals acting on the electronic cards. As a result, the electronic cards often easily drop out of the receiving cavities when the card connector is shaken or falls by accident.

SUMMARY OF THE INVENTION

An object of the present invention is to provide a card connector adapted for receiving a plurality of electronic cards therein. The card connector includes an insulating body defining at least one receiving cavity for receiving the electronic card therein, a plurality of electrical terminals disposed in the insulating body and projecting into the receiving cavity for electrically contacting with the corresponding electronic card, and a securing part. One wall of the receiving cavity is opened with a slot and a ring-shaped receiving groove communicated with one end of the slot. The receiving groove further penetrates sideward through the wall to communicate with the receiving cavity. A pillar is accordingly formed at the substantial centre of the receiving groove. The securing part has a semi-ring elastic portion and a pair of positioning arms parallelly extending towards a direction opposite to the elastic portion from two free ends of the elastic portion. The elastic portion is apart sleeved round the pillar and located in the receiving groove. The positioning arms are inserted in the slot and elastically abut against two inner sidewalls of the slot. The elastic portion further flexibly projects into the receiving cavity for elastically resisting against one side edge of the corresponding electronic card.

As described above, for the electronic cards, the insertion and extraction force not only depends on the friction of the electrical terminals acting on the electronic cards, but also depends from the elasticity counterforce of the securing part acting on the side edges of the electronic cards. So that effectively enhances the insertion and extraction force and ensures the electronic cards to be steadily in the receiving cavities even if the card connector is shaken or falls by accident.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
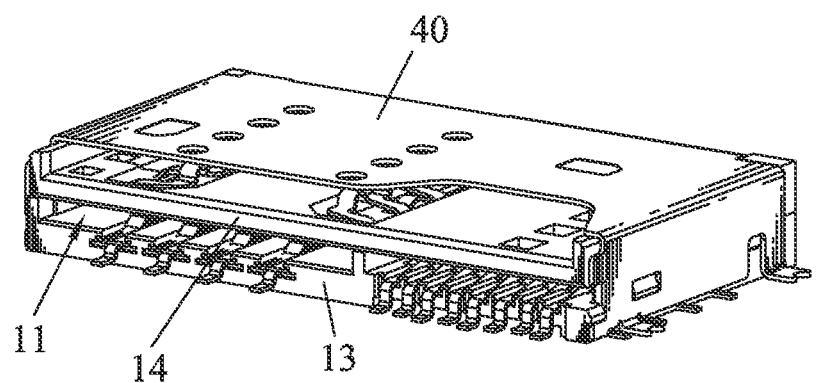
FIG. 1 is an assembled perspective view of a card connector in accordance with an embodiment of the present invention.
Figure 2:
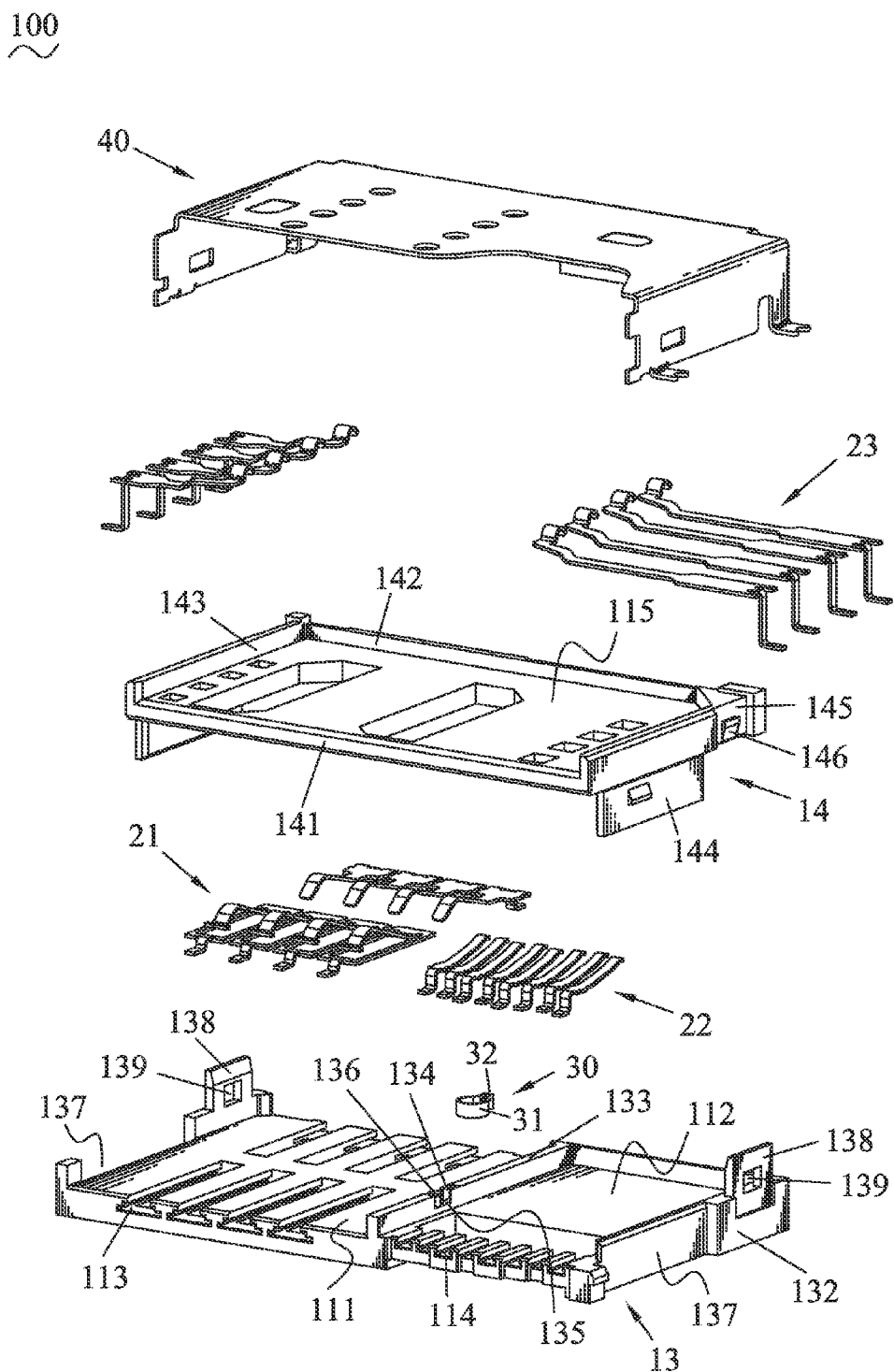
FIG. 2 is an exploded perspective view of the card connector of FIG. 1.
Figure 3:
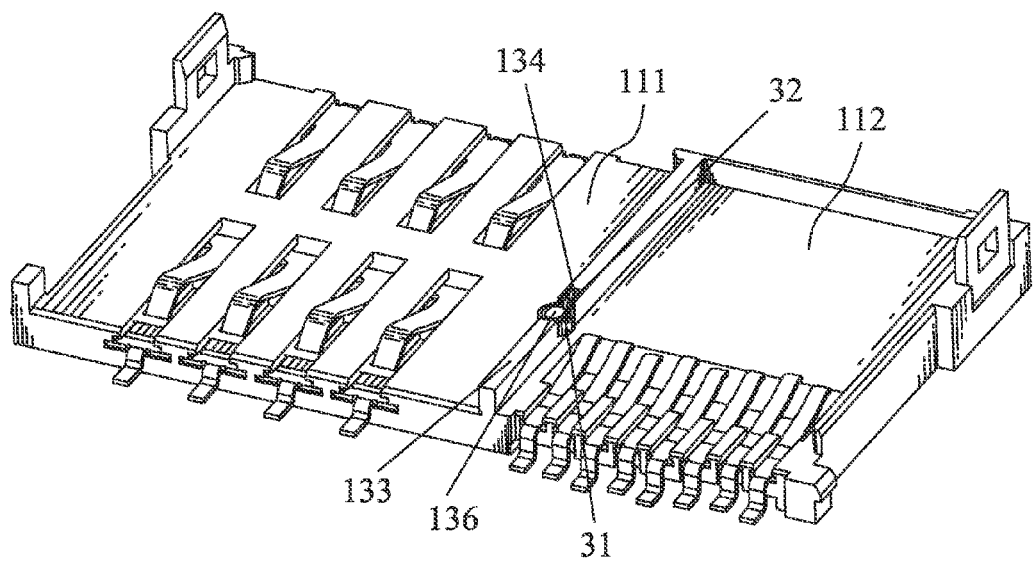
FIG. 3 is an assembled perspective view of a part of the card connector of FIG. 1.
Figure 4:
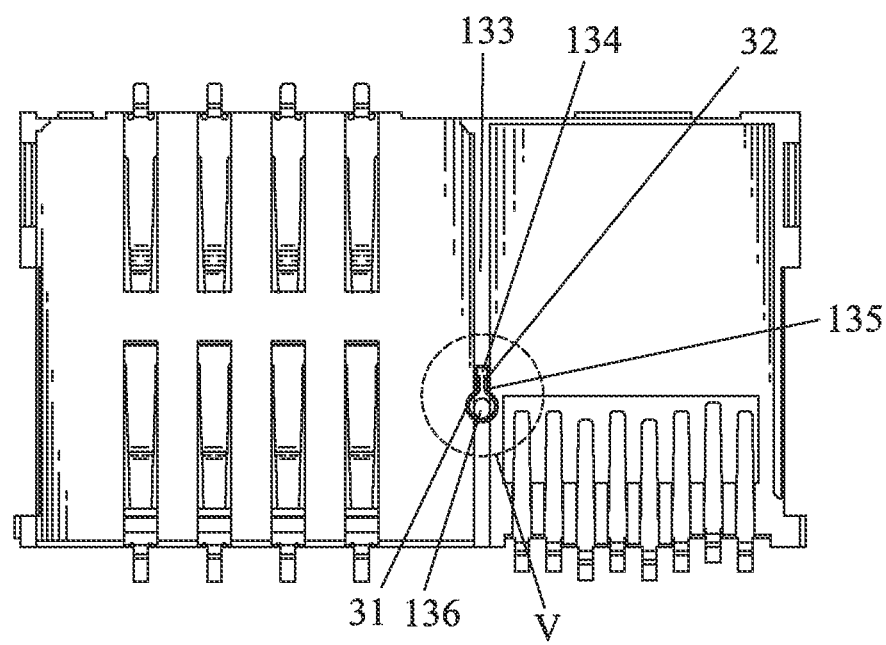
FIG. 4 is a vertical view of the part of the card connector of FIG. 3.
Figure 5:
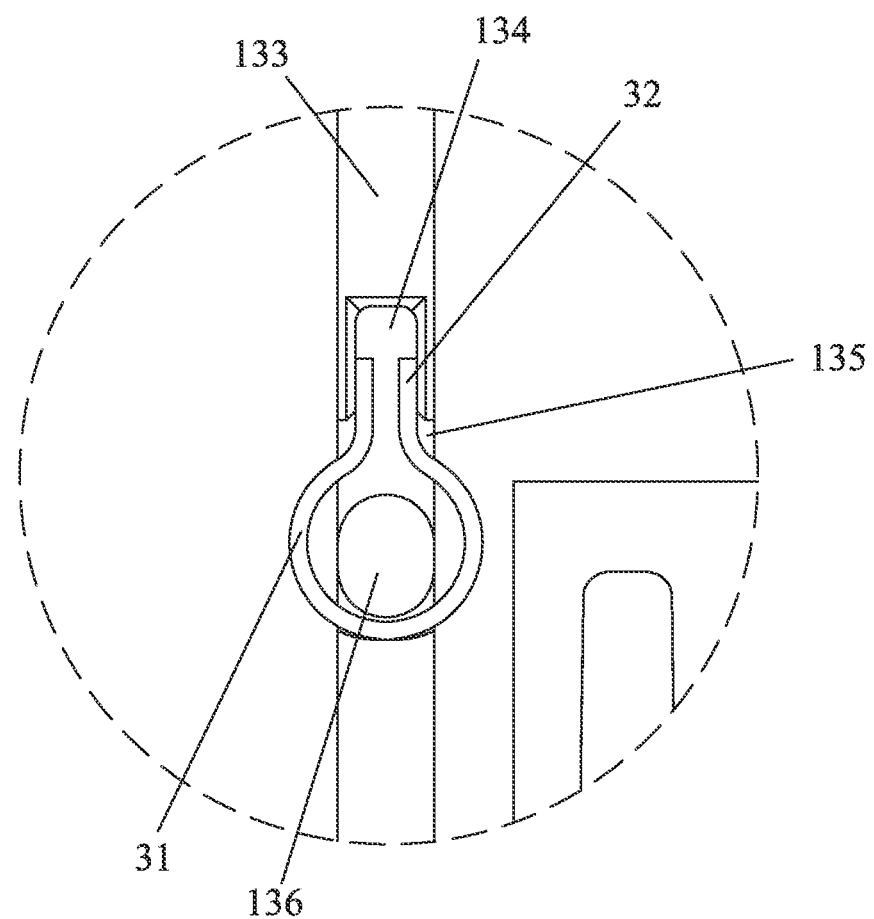
FIG. 5 is an enlarged view of a circled part V shown in FIG. 4.

With reference to FIGS. 1-6, a card connector 100 in accordance with an embodiment of the present invention is adapted for receiving a plurality of electronic cards 200 therein. The card connector 100 includes an insulating body, a plurality of electrical terminals, a securing part 30 and a shielding shell 40 enclosing the insulating body.

The insulating body defines at least one receiving cavity 11 for receiving the electronic card 200 therein. One wall of the receiving cavity 11 is opened with a slot 134 and a ring-shaped receiving groove 135 communicated with one end of the slot 134. The receiving groove 135 further penetrates sideward through the wall to communicate with the receiving cavity 11. A pillar 136 is accordingly formed at the substantial centre of the receiving groove 135. The electrical terminals are disposed in the insulating body and project into the receiving cavity 11 for electrically contacting with the corresponding electronic card 200. The securing part 30 has a semi-ring elastic portion 31 and a pair of positioning arms 32 parallelly extending towards a direction opposite to the elastic portion 31 from two free ends of the elastic portion 31. The elastic portion 31 is apart sleeved round the pillar 136 and located in the receiving groove 135. The positioning arms 32 are inserted in the slot 134 and elastically abut against two inner sidewalls of the slot 134. The elastic portion 31 of the securing part 30 further flexibly projects into the receiving cavity 11 for elastically resisting against one side edge of the corresponding electronic card 200.

In detail, in this embodiment, the insulating body includes a first insulating body 13 and a second insulating body 14 mounted on the first insulating body 13 with a stratiform structure. The receiving cavity 11 has three designated as a first receiving cavity 111, a second receiving cavity 112 and a third receiving cavity 115 respectively. The first receiving cavity 111 and the second receiving cavity 112 are apart opened in a top of the first insulating body 13 side by side. The third receiving cavity 115 is opened in a top of the second insulating body 14. The securing part 30 can be disposed in one wall of the first receiving cavity 111, the second receiving cavity 112 or the third receiving cavity 115.

Further, a separation wall 133 is accordingly formed between the first receiving cavity 111 and the second receiving cavity 112 of the first insulating body 13. A top of the separation wall 133 is concaved downward to form the slot 134 and the receiving groove 135. The receiving groove 135 further penetrates through two opposite sides of the separation wall 133 to communicate with the first receiving cavity 111 and the second receiving cavity 112. The elastic portion 31 of the securing part 30 has two opposite sides thereof flexibly project into the first receiving cavity 111 and the second receiving cavity 112 for elastically resisting against two side edges of the electronic cards 200 which are inserted in the first receiving cavity 111 and the second receiving cavity 112.

Further, two side walls 132 are accordingly formed at two outmost sides of the first receiving cavity 111 and the second receiving cavity 112. The outside of one end of each side wall 132 defines a fastening groove 137. The other end of each side wall 132 protrudes upward to form a fixing portion 138 in which a buckling hole 139 is opened. The second insulating body 14 has a bottom board 141, two lateral walls 143 and a rear wall 142 among which the third receiving cavity 115 is surrounded. One end of each lateral wall 143 protrudes downward to form a fastening board 144 fastened in the corresponding fastening groove 137 of the first insulating body 13. The outside of the other end of each lateral wall 143 is concaved inward to form a fixing groove 145 in which a buckling block 146 is protrudes outward. The fixing portions 138 are inserted in the corresponding fixing grooves 145 and the buckling blocks 146 are buckled in the buckling holes 139 respectively. Thereby, the second insulating body 14 and the first insulating body 13 can be firmly assembled together to form the insulating body.

Further, bottom sides of the first receiving cavity 111 and the second receiving cavity 112 define a plurality of first terminal grooves 113 and second terminal grooves 114 respectively. The electrical terminals includes a plurality of first electrical terminals 21, a plurality of second electrical terminals 22 and a plurality of third electrical terminals 23. The first electrical terminals 21 and the second electrical terminals 22 are assembled in the first terminal grooves 113 and the second terminal grooves 114 of the first insulating body 13 respectively and further project upward into the first receiving cavity 111 and the second receiving cavity 112. The third electrical terminals 23 are molded in the second insulating body 14 and further project upward into the third receiving cavity 115.

Figure 6:
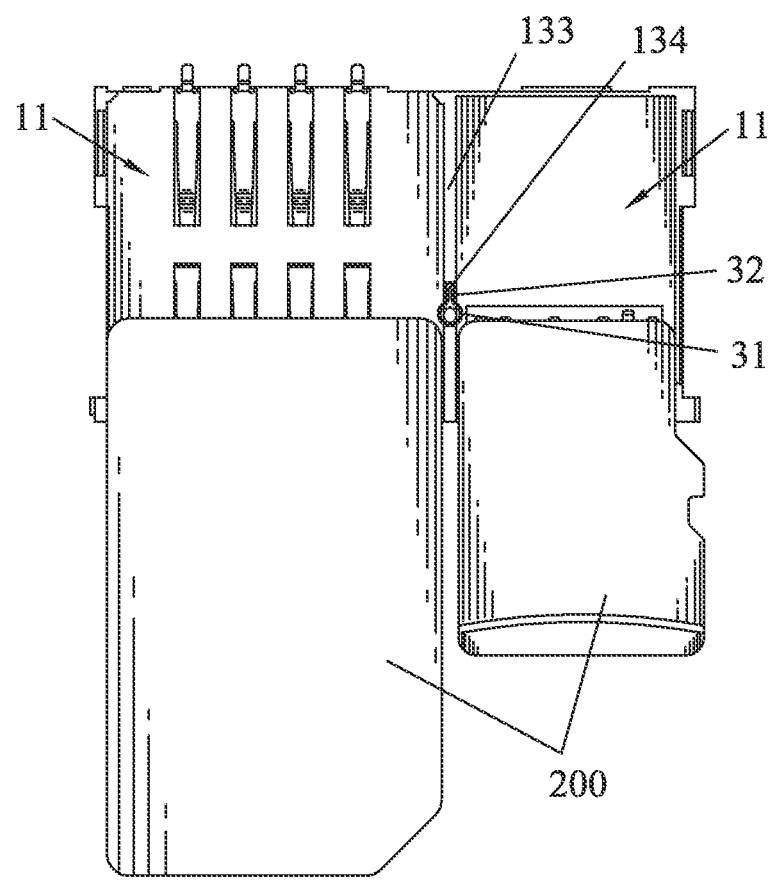
FIG. 6 is a vertical view showing that electronic cards are being inserted into the card connector of FIG. 1.

Referring to FIG. 6, in use, when the electronic cards 200 are inserted into the receiving cavities 11, the elastic portion 31 of the securing part 30 is squeezed by the electronic cards 200 to provide a relative elasticity on the side edges of the electronic cards 200 so as to secure the electronic cards 200 in the receiving cavities 11.

As described above, for the electronic cards 200, the insertion and extraction force not only depends on the friction of the electrical terminals acting on the electronic cards 200, but also depends from the elasticity counterforce of the securing part 30 acting on the side edges of the electronic cards 200. So that effectively enhances the insertion and extraction force and ensures the electronic cards 200 to be steadily in the receiving cavities 11 even if the card connector 100 is shaken or falls by accident.

What is claimed is:

1. A card connector adapted for receiving at least one electronic card, comprising:
   an insulating body defining at least one receiving cavity for receiving the electronic card therein, one wall of the receiving cavity being opened with a slot and a ring-shaped receiving groove communicated with one end of the slot, the receiving groove further penetrating sideward through the one wall to communicate with the receiving cavity, a pillar being accordingly formed at the substantial centre of the receiving groove;
   a plurality of electrical terminals disposed in the insulating body and projecting into the receiving cavity for electrically contacting with the electronic card; and
   a securing part having a semi-ring elastic portion and a pair of positioning arms parallelly extending towards a direction opposite to the elastic portion from two free ends of the elastic portion, the elastic portion being apart sleeved round the pillar and located in the receiving groove, the positioning arms being inserted in the slot and elastically abutting against two inner sidewalls of the slot, wherein the elastic portion further flexibly projects into the receiving cavity for elastically resisting against one side edge of the electronic card.

2. The card connector as claimed in claim 1, wherein the insulating body includes a first insulating body and a second insulating body mounted on the first insulating body with a stratiform structure, the receiving cavity has three designated as a first receiving cavity, a second receiving cavity and a third receiving cavity respectively, the first receiving cavity and the second receiving cavity are apart opened in a top of the first insulating body side by side, the third receiving cavity is opened in a top of the second insulating body.

3. The card connector as claimed in claim 2, wherein the one wall formed between the first receiving cavity and the second receiving cavity of the first insulating body is designated as a separation wall, a top of the separation wall is concaved downward to form the slot and the receiving groove, the receiving groove further penetrates through two opposite sides of the separation wall to communicate with the first receiving cavity and the second receiving cavity, the elastic portion of the securing part has two opposite sides thereof flexibly project into the first receiving cavity and the second receiving cavity for elastically resisting against two side edges of the electronic card which is inserted in the first receiving cavity and of the electronic card which is inserted in the second receiving cavity.

4. The card connector as claimed in claim 2, wherein two side walls are accordingly formed at two outmost sides of the first receiving cavity and the second receiving cavity, the outside of one end of each side wall defines a fastening groove, the other end of each side wall protrudes upward to form a fixing portion in which a buckling hole is opened, the second insulating body has a bottom board, two lateral walls and a rear wall among which the third receiving cavity is surrounded, one end of each lateral wall protrudes downward to form a fastening board fastened in the corresponding fastening groove of the first insulating body, the outside of the other end of each lateral wall is concaved inward to form a fixing groove in which a buckling block protrudes outward, the fixing portions are inserted in the corresponding fixing grooves and the buckling blocks are buckled in the buckling holes respectively.

5. The card connector as claimed in claim 2, wherein bottom sides of the first receiving cavity and the second receiving cavity define a plurality of first terminal grooves and second terminal grooves respectively, the electrical terminals includes a plurality of first electrical terminals, a plurality of second electrical terminals and a plurality of third electrical terminals, the first electrical terminals and the second electrical terminals are assembled in the first terminal grooves and the second terminal grooves of the first insulating body respectively and further project upward into the first receiving cavity and the second receiving cavity, the third electrical terminals are molded in the second insulating body and further project upward into the third receiving cavity.

6. The card connector as claimed in claim 1, further comprising a shielding shell which encloses the insulating body.

* * * * *